United States Patent
Bass et al.

(10) Patent No.: US 6,727,851 B2
(45) Date of Patent: Apr. 27, 2004

(54) SYSTEM FOR SIGNAL EMITTER LOCATION USING ROTATIONAL DOPPLER MEASUREMENT

(75) Inventors: Charles David Bass, Macon, GA (US); Jerome S. Finnigan, Macon, GA (US); Peter Joseph Bryant, Macon, GA (US)

(73) Assignee: The Corporation of Mercer University, Warner Robins, GA (US)

( * ) Notice: Subject to any disclaimer, the term of this patent is extended or adjusted under 35 U.S.C. 154(b) by 0 days.

(21) Appl. No.: 09/957,332

(22) Filed: Sep. 20, 2001

(65) Prior Publication Data

US 2002/0033769 A1 Mar. 21, 2002

Related U.S. Application Data

(60) Provisional application No. 60/233,956, filed on Sep. 20, 2000.

(51) Int. Cl.⁷ .................................................. G01S 3/02
(52) U.S. Cl. ........................................ 342/418; 342/451
(58) Field of Search ................................ 342/418, 451

(56) References Cited

U.S. PATENT DOCUMENTS 5,430,445 A  *  7/1995  Peregrim et al. ............. 342/25

\* cited by examiner

Primary Examiner—Theodore M. Blum
(74) Attorney, Agent, or Firm—Bernstein & Associates, P.C.; Jason A. Bernstein

(57) ABSTRACT

A system for locating electromagnetic signal sources via the rotational Doppler effect whereby a radar station generating electromagnetic signals, such as radar frequency signals, initially scans the sky for aircraft. An aircraft having the system operationally installed thereon and utilizing apparatus or navigational systems already present on the aircraft receives radar signals. The system is programmed to capture radar signal parameters and extract the rotational Doppler frequencies induced by the motion of the aircraft. The angular velocity of the host platform is often the dominant source of this frequency; however, lateral velocity is not detrimental to the process. The measurement of the rotational Doppler frequency is accomplished through antennas presently installed on large numbers of military aircraft with no requirement for phase calibration of the electrical paths between antennas and receiver. The method requires synchronization of these measurements with data from the navigation system (INS, EGI, or other) that describes the aircraft motion during the measurement process. The method applies an equation combining several navigation parameters to predict the theoretical rotational Doppler frequencies from hypothetical emitter locations. Prediction of the unknown emitter location from a sequence of measured rotational Doppler frequencies is accomplished by the principle of least squares estimation based on the previously referenced equation.

12 Claims, 4 Drawing Sheets

SYSTEM FOR SIGNAL EMITTER LOCATION USING ROTATIONAL DOPPLER MEASUREMENT

CROSS REFERENCE TO RELATED APPLICATION

This application claims the benefit of U.S. Provisional Application No. 60/233,956 filed on Sep. 20, 2000, the disclosure of which is incorporated herein.

FIELD OF THE INVENTION

The invention relates, generally, to a system for passively locating electromagnetic signal sources. In particular, the invention relates to a system for measuring rotational Doppler frequencies imposed on an electromagnetic signal by the motion of an aircraft. More particularly, the invention relates to using these rotational Doppler frequencies to determine the location of the source of the radar signal impinging on the aircraft.

BACKGROUND OF THE INVENTION

Many military aircraft today have electronic warfare (EW) systems including some form of radar warning and/or targeting capability. However, because of opponent countermeasures and the need for increased accuracy in targeting, it is desirable to develop improved systems and methods for military aircraft to passively locate enemy radar systems. Furthermore, in order to be cost effective it is desirable to develop upgrades to current systems that utilize existing antenna/cable assemblies on existing aircraft without the need for costly and difficult calibration procedures.

A number of radar detection systems for aircraft are known in the art. U.S. Pat. No. 5,870,056 to Fowler discloses an air-to-air passive location system comprising two antennae on a moving aircraft that determines Doppler frequency and long baseline interferometer (LBI) measurements. These are based on certain equations which are then used to provide initial estimates of the position of the emitter parameters. The initial estimates are then used in least squares calculations to estimate the position and velocity of the transmitter. However, this system is air-to-air specific, and requires phase coherent pulse trains and a phase calibrated interferometer.

U.S. Pat. No. 5,572,427 to Link et al. discloses a Doppler position bearing angle locator, comprising determining the location of a radio frequency source relative to an antenna on a moving aircraft by measuring the Doppler shift of the frequency of the source induced by motion of the antenna/aircraft. The system uses multiplexing, demultiplexing, modulation, and demodulation. The Doppler detection is based on active cooperation of the signal source (e.g., a navigation system), and thus the system cannot be used for passive location of non-cooperative or hostile signal sources.

U.S. Pat. No. 4,942,404 to Kefer discloses a passive Doppler differential ranging system and method. Kefer provides two antennae for receiving radar signals over time as the aircraft moves, and a system for calculating two differential Doppler phase shifts and the differential therebetween for determining the range of the signal source. This system assumes as negligible the rotation of the antenna baseline induced by the aircraft angular velocity.

U.S. Pat. No. 5,708,443 to Rose discloses a method and apparatus for using signal Doppler change to resolve long baseline interferometer ambiguous phase change measurements for locating a radar emitter. Rose provides a single antenna to measure the Doppler change in signal angle of arrival caused by the aircraft motion relative to the signal emitter as a means of passively locating the emitter. The Doppler effect from the lateral velocity is then used to remove ambiguities in an LBI instead of using antenna-array-derived SBI measurements. The system requires a coherent pulse train and assumes angular velocity is negligible.

U.S. Pat. No. 5,406,291 to Guerci et al. discloses a passive emitter location system. A multiplex system for an aircraft is provided for non-simultaneous measurement of the signal bearing and the Doppler induced frequency shifts using extended Kalman filters, single-measurement delayed initialization techniques, and the aircraft's inertial navigational system. The system provides a single antenna design but requires accurate (0.5 degrees) direction finding capability and a highly stable (3 Hz) signal source, which conditions are rarely if ever found on military fighter aircraft.

U.S. Pat. No. 5,218,361 to Avila et al. discloses interferometer ambiguity resolution using missile roll, comprising a receiver that measures signal parameters received by interferometer antenna elements and determines the bearing to a transmitting antenna by using the missile and antenna roll motion to reorient the interferometer baseline. Avila et al. considers only phase-calibrated interferometer methods.

U.S. Pat. No. 5,969,677 to Herrmann et al. discloses a direction-finding method for determining the incident direction of a high-frequency electromagnetic signal. The method provides using at least two spatially separated antennae. Each antenna receives a signal with the phase difference between the signals determined through a phase-sequence analysis, and the incident angle of the signal (relative to the antenna) determined from these values. The direction finding is based on phase calibrated antenna pairs, with no apparent consideration of any platform motion.

U.S. Pat. No. 5,936,575 to Azzarelli et al. discloses an apparatus and method for determining angles-of-arrival and polarization of incoming RF signals. There is disclosed a non-planar array of at least two antennae and amplitude measurements of the incoming signals processed to provide the required polarization induced phase correction which allows for the determination of the angles-of-arrival. Signal polarization and phase are combined to correct anomalies in a 3 (or more) antenna azimuth/elevation direction-finding system, with no apparent consideration of any platform motion.

U.S. Pat. No. 5,724,047 to Lioio et al. discloses a phase and time-difference precision direction-finding system comprising at least two antennae for receiving signals. There are determined multiple ambiguous estimates of the angle of arrival based on the phase difference and frequency values, a coarse estimate of the angle of arrival based on a time difference of arrival calculation, and a precision angle of arrival estimate which is the ambiguous estimate closest to the coarse estimate based on phase interferometry. Time differences of arrival measurements are used to resolve ambiguities in a phase calibrated interferometer.

U.S. Pat. No. 5,526,001 to Rose et al. discloses precise bearings only geolocation in systems with large measurements bias errors. Antennae on aircraft are used to measure from multiple aircraft platforms the bearing rate of change and/or bearing differences, which are associated with circles on which the emitters must lie. There is provided bearings only geolocation requiring that the angular velocity term be ignored or removed.

These systems and methods may be suitable in some applications. However, these systems and methods leave room for improvement in the areas of more accurate and reliable radar location determination at a low cost.

For example, several of these systems are based on phase calibrated antenna methods. Accomplishing such phase calibration of existing antennae and cables on current military aircraft is very difficult and costly.

Additionally, the patents disclosing non-calibrated phase methods explicitly or inferentially assume that the lateral velocity term in the Doppler equation is the dominant source of the desired emitter location information. For these systems the angular velocity term is assumed to be either negligible or a source of confusion to be removed prior to the main computation.

Accordingly, what is needed but not found in the prior art are systems and methods exploiting both the lateral and angular velocity of military aircraft to improve their capability to passively locate enemy radar systems. Further, these systems and methods should accommodate existing antenna/cable assemblies on existing aircraft without the need for costly and difficult calibration procedures.

SUMMARY OF THE INVENTION

The present invention is a system for locating electromagnetic signal sources via the rotational Doppler effect. A radar station generating electromagnetic signals, such as but not limited to, radar frequency signals, scans the sky for aircraft. An aircraft having the present invention operationally installed thereon and utilizing apparatus or navigational systems already present on the aircraft receives those signals. The apparatus may, if desired, incorporate a computer, a multi-channel receiver, an inertial navigation system, and at least two receiving antennae.

The present invention is programmed to capture a time series of buffers of sampled signals from the signal source with an appropriately designed and tuned receiver through two or more spatially separated antennae. It then analyzes the sampled signals in each buffer, measures the rotational Doppler frequency that the aircraft motion has imparted to the signals of each buffer, and identifies the messages from the aircraft navigation system that describe the aircraft motion during the signal sampling process. A vector formula, given below, describing. the physics of the rotational Doppler effect predicts the series of rotational Doppler frequencies that would be measured from any hypothetical emitter location. A least squares algorithm applies this formula to a large grid of hypothetical emitter locations surrounding the aircraft sub-point. At each grid point every hypothetical rotational Doppler frequency is compared to the corresponding measured rotational Doppler frequency and the square of the discrepancy between the two is accumulated over the selected time interval. Finally, the least squares prediction of the emitter location is (by definition) the location of that grid point with the lowest accumulated squared discrepancy.

In a preferred embodiment, the present invention provides a system for determination of the location of emitters generating electromagnetic signals, the system being operationally disposed on an aircraft, the system having incorporated therein a computer, a multi-channel receiver, an inertial navigation system, and at least two receiving antennae, comprising the steps of:

a) receiving selected emitter signals via the receiving antennae;

b) formulating an emitter location grid;

c) deriving a hypothetical Delta Phase Rate, or rotational Doppler, for each grid point based upon the dynamics of the host platform;

d) deriving an actual Delta Phase Rate from said received emitter signals;

e) comparing said hypothetical Delta Phase Rate to said actual Delta Phase Rate for hypothetical emitter locations and calculating the discrepancy between them;

f) accumulating over a selected interval of time said compared squared discrepancies for a plurality of points in said grid; and g) determining a prediction of the emitter location via said accumulated discrepancies.

When taken in conjunction with the accompanying drawings and the appended claims, other features and advantages of the present invention become apparent upon reading the following detailed description of embodiments of the invention.

BRIEF DESCRIPTION OF THE DRAWINGS

The various features and advantages of the invention will be apparent from the attached drawings, in which like reference characters designate the same or similar parts throughout the figures, and in which.

DETAILED DESCRIPTION OF THE PREFERRED EMBODIMENTS

Figure 1:
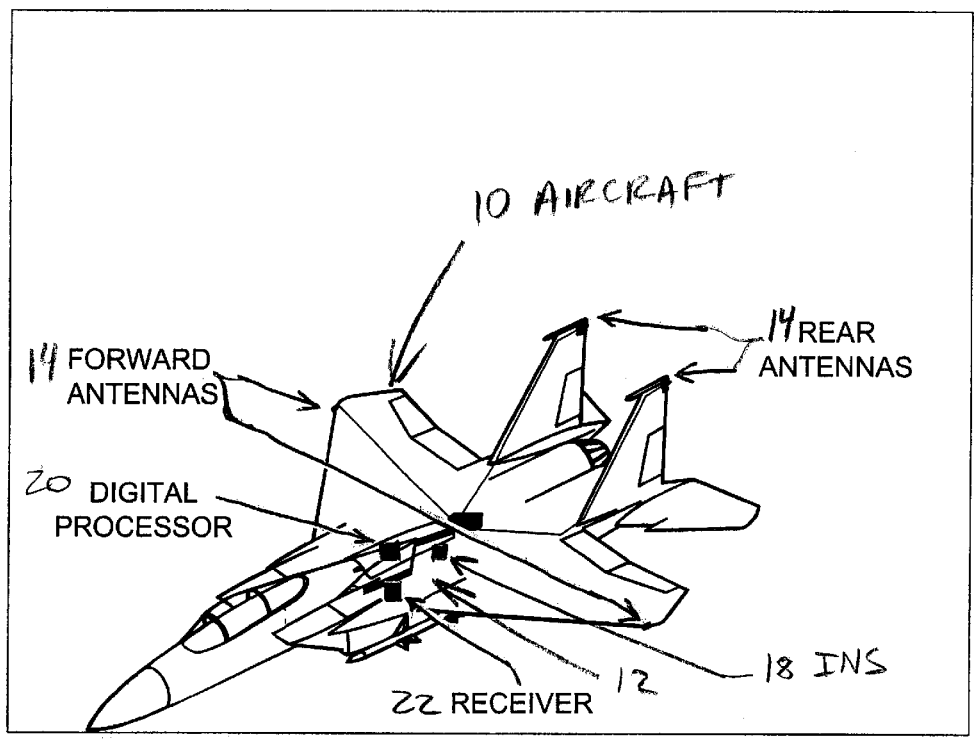
FIG. 1 illustrates a perspective view schematic of a conventional fighter aircraft in combination with a preferred embodiment of the present invention.

Before describing in detail the particular improved system for determining the location of emitters generating electromagnetic signals in accordance with the present invention, it should be observed that the invention resides primarily in the novel data structures of the system software and not in the combination of conventional system apparatus. Examples of a system apparatus include an aircraft having associated computer displays, a computer, a multi-channel receiver and antennas. The present invention utilizes discrete subsystems or subassembly components, and associated control of the aforementioned system apparatus and components. The invention is not in the particular detailed configuration of the system apparatus but in the command and control thereof. Accordingly, the data structures, command, control, and arrangement of the present invention have, for the most part, been illustrated in the drawings by readily understandable block diagrams and flowcharts. The drawings show only. those specific details that are pertinent to the present invention in order not to obscure the disclosure with structural details which will be readily apparent to those skilled in the art having the benefit of the description herein.

A more detailed discussion of the present invention: Radar signals emitted from a ground based or airborne transmitter are received by an aircraft in flight. The rotational and lateral motion of the aircraft collectively produce a rotational Doppler effect that is detected by the aircraft's onboard multi-channel receiver as a frequency imparted to the received signal. In general, the present invention 10, FIG. 1 predicts the emitter location by applying the principle of least squares to a series of such rotational Doppler frequency measurements and the record of the aircraft motion provided by the aircraft's navigation system.

A conventional military aircraft 11 may, if desired, be fitted with the present invention 10. The aircraft 11 typically has a radar warning system comprising among other components at least two antennae 12, a radar warning receiver (RWR) 16, FIG. 2, and an Inertial Navigation System (INS) 13, operatively connected together. Current and/or future INS 13 may include an embedded Global Positioning System (GPS) receiver to eliminate the navigational errors that otherwise slowly accumulate during flight.

The aircraft 11, FIG. 1 typically has more than one antenna. The aircraft 11 may, if desired, have a plurality of antennae strategically placed about the aircraft 11. For example the aircraft 11, FIG. 1 is a U.S. Air Force F-15 which has two forward antennae 15, one on each of it's wing tips, and two rear antennae 12, one on each of the vertical stabilizers. A rotational Doppler frequency (as discussed herein) is measured through pairs of these antennas. The present invention 10, does not require any special calibration procedures prior to or during use. The relatively large distance of separation between any given antennae (compared to radar wavelengths) and the substantial maneuverability of conventional fighter aircraft 11 generate the long turning baseline vectors that are the dominant source of the rotational Doppler effect.

Figure 2:
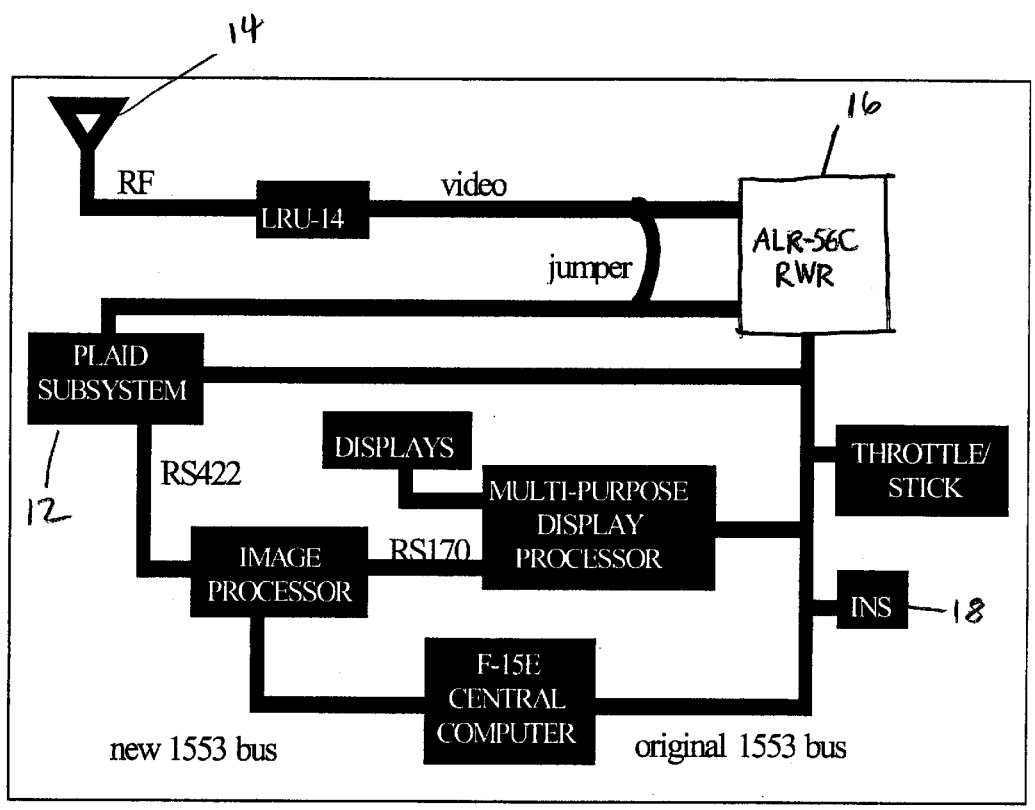
FIG. 2 illustrates a block diagram of the present invention of FIG. 1.

A subsystem 17, FIG. 2 of the present invention 10 is a Precision Location and Identification (PLAID) subsystem. The PLAID subsystem 17 may, if desired, have operationally installed therein a digital processor 18, FIG. 1 and a receiver 19. Preferably, the digital processor 18 and a receiver 19 are installed on the aircraft 11 near the INS 13. The digital processor 18 may, if desired, be based on commercially available components such as a 100 MHz Motorola® Power PC 604 running Microsoft® Windows® NT 4.0.

The receiver 19, FIG. 1 is preferably provided by a wide-band multi-channel microwave receiver combining high-speed digital signal processing with a highly stable internal clock to precisely measure a variety of radar signal parameters specifically of interest in EW applications. For example, the receiver 19 may be selected for precisely measuring radar signal parameters such as amplitude, time, phase and/or frequency. The receiver 19 has RF signals routed to it from the antennae 12 through preamplifiers and cables, which are typically pre-existing components connected to the RWR of current aircraft 11. It will be understood by those skilled in the art that the receiver 19 can be of a commercially available type selected for measuring a time of arrival and carrier phase difference between antennae for each detected pulse.

The PLAID system 17, FIG. 2 (including the processor 18 and receiver 19) are interconnected with the antennae 12, the radar warning receiver 16, the INS 13, and other related systems aboard the aircraft 11. The PLAID system 17 receives RF signals from the antennae 12 and INS data from the INS 13.

Figure 3:
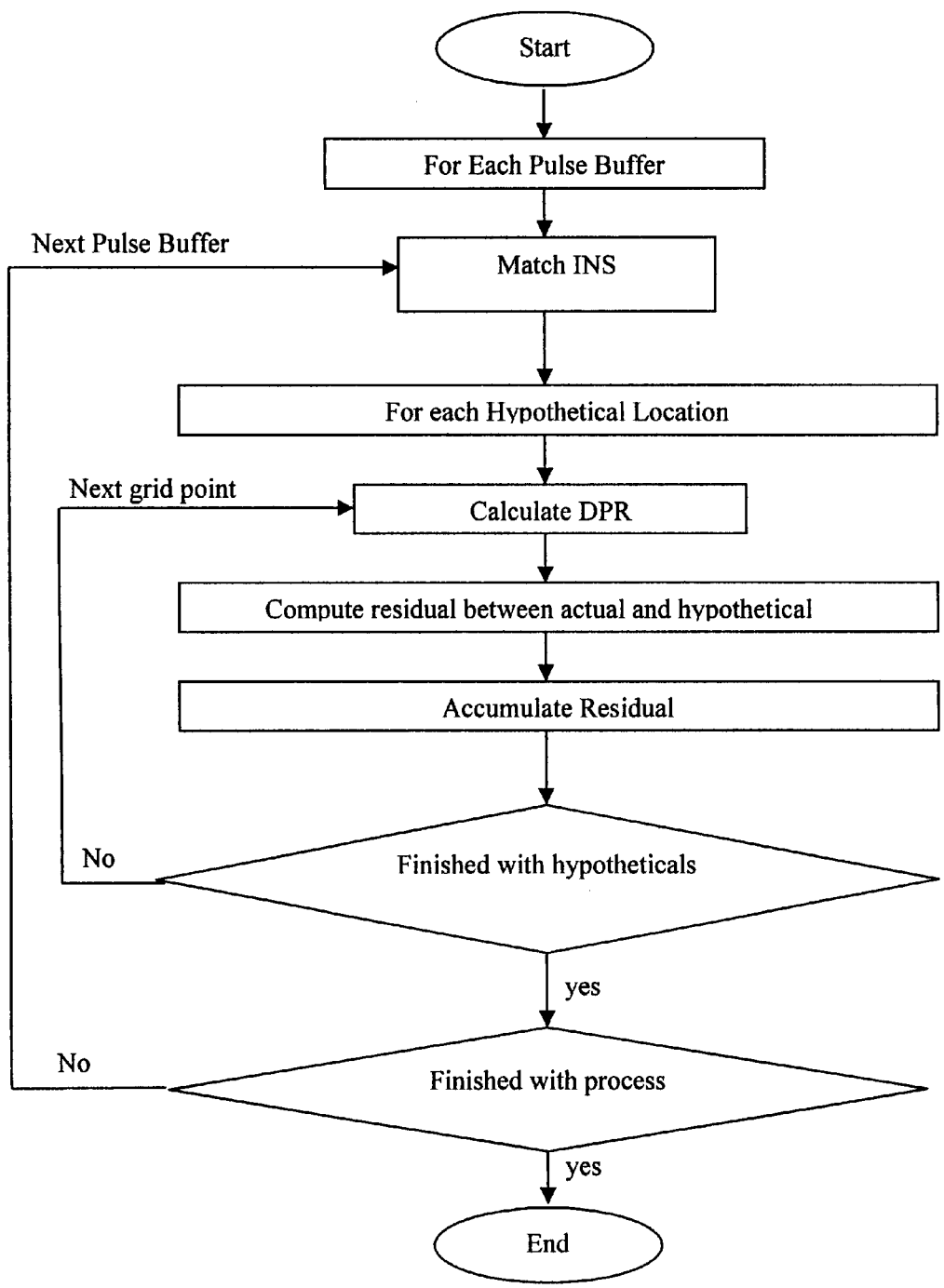
FIG. 3 illustrates is a flow diagram of the capturing and processing of the present invention.

The processor 18, FIG. 1 is programmed to capture a buffer of samples of the signal of interest 25, FIG. 3, analyze the signal parameter measurements and extract the rotational Doppler frequency imparted to the received signal by the motion of the aircraft. A least squares algorithm applies pertinent physics formulas (discussed herein) to calculate a hypothetical rotational Doppler frequency (or "Delta Phase Rate" or "DPR") 20 at each point in a large grid of hypothetical emitter locations. At each grid point, the hypothetical rotational Doppler frequency is compared to the measured rotational Doppler frequency and the square of the discrepancy between the two is accumulated 22 over a selected time segment of interest. Finally, the least squares prediction 23 of the emitter location is (by definition) the location 24 of that grid point with the lowest accumulated squared discrepancy. Through this algorithm emitter locations may be predicted from short segments, for example, 10 seconds, of rotational Doppler measurements and aircraft motion descriptions 26.

The measured rotational Doppler frequency is derived from two of the pulse parameters measured by the receiver 19, FIG. 1, the time of arrival (TOA) and the phase difference across the two receiver channels (delta phase). For a typical pulse collection consisting of 12 to 200 consecutive pulses, the measured rotational Doppler frequency is the slope of the line that best fits the corresponding collection of {TOA, delta phase} pairs. A piecewise linear regression calculation can be used to measure this slope with lower outlier sensitivity than the standard linear regression procedure.

In contrast to this measured rotational Doppler frequency, the theoretical rotational Doppler frequency from a hypothetical emitter location is computed with the vector derivative formulas below:

Uncalibrated Delta Phase=$\phi(B_T * u/\lambda + \beta) \mod 1$

Predicted Rotational Doppler Frequency=$d\phi/dt = (dB^T/dt * u + B^T * du/dt)/\lambda$ $du/dt = -(I - u * u^T) * v/R$ where:
  u=unit vector pointing from aircraft to emitter,
  R=range from aircraft to emitter,
  $\lambda$=signal wavelength,
  $\beta$=bias due to the absence of phase calibration (we assume $d\beta/dt=0$),
  B=antenna baseline vector (i.e., the vector drawn between the two antenna positions),
  dB/dt=rate of change of the antenna baseline vector,
  v=aircraft velocity vector and
  I=3×3 identity matrix.

These formulas describe the physics of the rotational Doppler effect and illustrate why its detection requires no phase calibration among the receiving antennae. The formulas relate a hypothetical emitter location (described by u and R) to quantities measured by the receiver ($\lambda$ and $d\phi/dt$) and quantities provided by the aircraft's navigation system (B, dB/dt and v). These relationships are the basis for the computation of the hypothetical rotational Doppler frequency at each grid point in the least squares algorithm. It will be noted that the aircraft angular velocity often generates the dominant source of emitter location information while the lateral velocity term is often relatively small. It will be understood that the system and method described herein incorporates both angular and lateral velocity terms of the Doppler equation to successfully compute accurate emitter location predictions from the rotational Doppler frequencies measured in flight. However, the system and method could be used in a laterally stationary, but rotating, system equally well (e.g., helicopter, UAV, etc.).

In using the carrier phase differences across the antennae, the rotational Doppler frequency measurement is an unconventional application of the RWR antennae. These antennae are designed, manufactured and installed not for their phase characteristics, but rather for their large beamwidths and bandwidths which are needed to provide the large field of view and wide frequency range required by the RWR. Despite the large number of these antennae in use on military aircraft, essentially nothing is known about their phase characteristics because these characteristics are irrelevant to the conventional functions of the RWR. For this reason the feasibility of the rotational Doppler concept needed verification by test flights with conventional aircraft 11.

Figure 4:
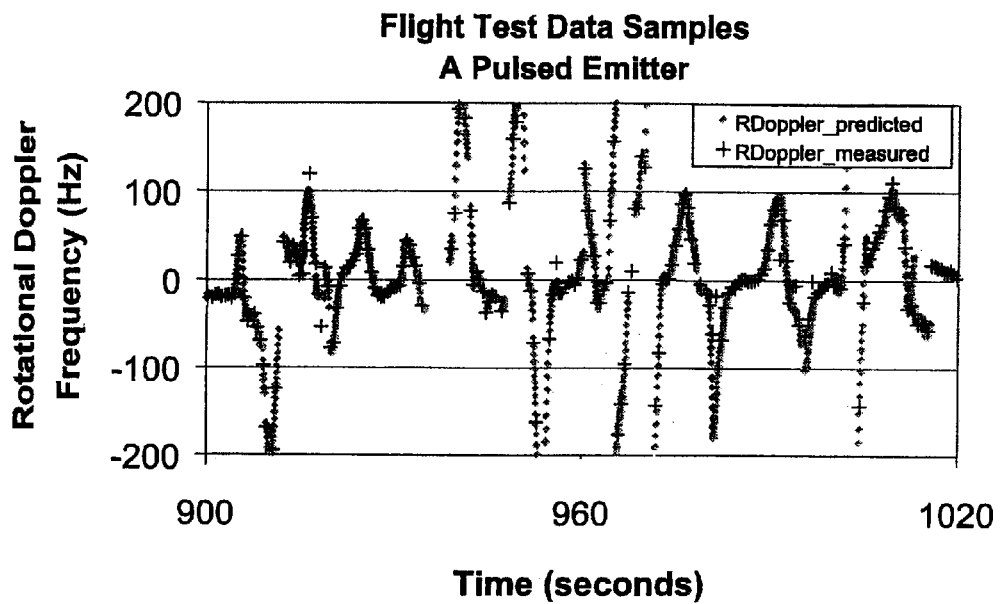
FIG. 4 illustrates a graph of flight test results for the present invention wherein the radar source is a pulsed emitter.
Figure 5:
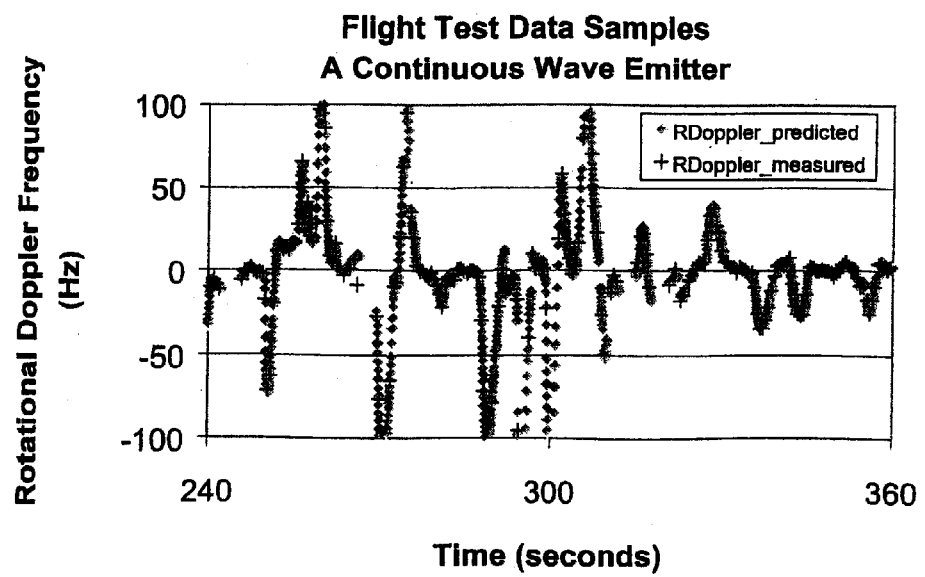
FIG. 5 illustrates a graph of flight test results for the present invention wherein the radar source is a continuous wave emitter.

Flight demonstrations were conducted using an F-15 fighter aircraft fitted with the PLAID subsystem 10 to test a number of algorithms developed under the PLAID R & D program. Subsequent to those flights, the rotational Doppler concepts were developed and tested using the database of signals collected and paths flown during those demonstrations. Rotational Doppler frequencies extracted from signal parameters measured in flight were compared with theoretical values predicted by application of the above formulas to the known emitter location. FIGS. 4 and 5 illustrate this comparison for the two major radar signal types: a pulsed radar signal in FIG. 4; a continuous wave radar signal in FIG. 5. These comparisons verify that the rotational Doppler formula consistently predicts values measured in flight from a known emitter location. This consistency suggests that, inversely, an algorithm based on the rotational Doppler formula and the principle of least squares might predict an unknown emitter location from a series of measured rotational Doppler frequencies.

The grid search implementation of the principle of least squares flowcharted in FIG. 3 represents a prototype implementation of such an algorithm. Application of this algorithm to randomly selected 10-second excerpts from the database of signals and flight paths yielded emitter location predictions with a median accuracy better than one nautical mile. This emitter location accuracy statistic is a substantial improvement over any other passive location method yet attempted with the F-15 antenna configuration and demonstrates the effectiveness of the present invention 10, for the F-15 aircraft in particular and for all aircraft with suitable antenna configurations.

Alternative embodiments of the present invention 11 may arise in the application of the rotational Doppler system and method to different aircraft. These variations may be based on the flight dynamics of the aircraft; the number, location, and orientation of antennae installed on the aircraft; the message formats and coordinate systems used by the INS or EGI in its description of the aircraft motion; the communication protocols governing message flow between the aircraft's central computer, INS, and other avionics subsystems, and in a particular formulation of the least-squares solution.

In operation, the present invention 10, FIG. 2 receives a radar carrier signal by two or more antennae installed at different positions on an aircraft's 11 body. The present invention 10 measures the carrier signal phase difference over a selected number of consecutive measurements with a two or more channel receiver to determine the phase difference rate of change. This rate of change of phase difference, induced by the rotational velocity of the aircraft, is the rotational Doppler frequency. The rotational Doppler frequency relates to the signal source range, direction and carrier frequency. The aircraft's 11 orientation, lateral velocity and angular velocity is provided by the INS or EGI 13, FIG. 2. The emitter location may thus be determined based on these known relationships.

Accordingly, the present invention 10 requires neither collimation nor phase calibration of the receiving antennae. The squinted, un-calibrated cavity backed spiral antennae typically installed on operational fighter aircraft produce good agreement between measured and theoretical values of the rotational Doppler frequency.

It will be understood that the methods steps of the invention can be carried out in various sequences, and the sequences described herein are provided as an illustration only and by no means as a limitation in any sense. It will be further understood that the terms "a" and "an" as used herein are not intended to mean only "one," but may also mean a number greater than "one." All patents referred to herein are hereby incorporated by reference in their entirety.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures.

While the invention has been described in connection with certain preferred embodiments, it is not intended to limit the scope of the invention to the particular forms set forth, but, on the contrary, it is intended to cover such alternatives, modifications, and equivalents as may be included within the true spirit and scope of the invention as defined by the appended claims. All patents, applications and publications referred to herein are incorporated by reference in their entirety.

What is claimed is:

1. A system for determination of the location of emitters generating electromagnetic signals, the system being operationally disposed on an aircraft, the system having incorporated therein a computer, a multi-channel receiver, an inertial navigation system, and at least two receiving antennae, comprising the steps of:
   a) receiving selected emitter signals via the receiving antennae;
   b) formulating an emitter location grid;
   c) deriving a hypothetical Delta Phase Rate, or rotational Doppler, for each grid point based upon the dynamics of the host platform;
   d) deriving an actual Delta Phase Rate from said received emitter signals;
   e) comparing said hypothetical Delta Phase Rate to said actual Delta Phase Rate for hypothetical emitter locations and calculating the discrepancy between them;
   f) accumulating over a selected interval of time said compared squared discrepancies for a plurality of points in said grid; and
   g) determining a prediction of the emitter location via said accumulated discrepancies.

2. The system of claim 1, wherein said step of receiving a selected emitter signal further comprises the step of counting said received emitter signals for a selected time period.

3. The system of claim 2, wherein said selected time period is at least the duration of two or three measurements.

4. The system of claim 3, wherein said step of receiving selected emitter signals comprises receiving successive emitter signals.

5. The system of claim 4, wherein said step of determining said measured Delta Phase Rate further comprises the steps of:
 a) measuring a time of arrival of said received selected emitter signals;
 b) measuring a phase difference between said received selected emitter signals; and
 c) deriving said measured Delta Phase Rate from said measuring a time of arrival of said received selected emitter signals and said measuring a phase difference between said received selected emitter signals.

6. The system of claim 5, wherein said measured Delta Phase Rate is a best fit slope of the line of correspondingly measured time of arrival of said received selected emitter signals and said measured phase difference between said received selected emitter signals.

7. A system for determination of the location of emitters generating electromagnetic signals, the system being operationally disposed on an aircraft, the aircraft having disposed thereon a computer, a multi-channel receiver, an inertial navigation system, at least two receiving antennae, a software program stored in the computer memory, the software program having a plurality of data structures formulated into instructions to direct the functioning of the system for identification of the location of emitters generating electromagnetic signals, said system comprising:
 a) an emitter parameters data structure to store said emitter signal parameters of said received selected emitter signals measured by said receiver which is in communication with said receiving antennae;
 b) an actual rotational Doppler data structure containing said measured rotational Doppler, or Delta Phase Rate, calculated from said emitter parameters data structure;
 c) a grid data structure which contains coordinates of hypothetical emitter locations in space;
 d) a flight dynamics data structure containing the host platform's dynamical history for the period of time under observation;
 e) a hypothetical emitter rotational Doppler data structure in communication with said flight dynamics data structure and said grid data structure, which contains hypothetical rotational Doppler values for a plurality of points in the grid data structure; and,
 f) a difference accumulator data structure in communication with said emitter location grid data structure and said actual rotational Doppler data structure, said difference accumulator data structure containing the squared difference of said hypothetical emitter rotational Doppler data structure and actual rotational Doppler data structure for said plurality of points in said grid structure.

8. The system of claim 7, wherein said receiving selected emitter signals data structure receives un-calibrated phase data from the multi-channel receiver.

9. The system of claim 8, wherein said hypothetical Delta Phase Rate data structure being derived from angular velocity of the aircraft and hypothetical locations of an emitter in space.

10. The system of claim 9, wherein said actual Delta Phase Rate data structure being derived from measurements of phase and TOA by said receiver of the incident signal.

11. The system of claim 10, wherein said emitter location grid is systematically laid out by any acceptable methodology of laying out a grid.

12. The system of claim 10, wherein said emitter location grid is loosely defined, consisting of any systematic appointing of nodes in space to describe a possible location of said emitter which are provided to compare hypothetical and measured rotational Doppler and derive a discrepancy between said hypothetical and measured rotational Doppler for the purpose of estimating the most probable location of said emitter.

* * * * *